(12) United States Patent
Baehrle-Miller et al.

(10) Patent No.: US 9,643,583 B2
(45) Date of Patent: May 9, 2017

(54) METHOD FOR PROVIDING THE CLAMPING FORCE GENERATED BY A PARKING BRAKE

(71) Applicant: Robert Bosch GmbH, Stuttgart (DE)

(72) Inventors: Frank Baehrle-Miller, Schoenaich (DE); Peter Blessing, Heilbronn (DE); Matthias Engelmann, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/389,569

(22) PCT Filed: Feb. 8, 2013

(86) PCT No.: PCT/EP2013/052503
§ 371 (c)(1),
(2) Date: Sep. 30, 2014

(87) PCT Pub. No.: WO2013/149743
PCT Pub. Date: Oct. 10, 2013

(65) Prior Publication Data
US 2015/0066324 A1 Mar. 5, 2015

(30) Foreign Application Priority Data
Apr. 4, 2012 (DE) .................. 10 2012 205 576

(51) Int. Cl.
*B60T 13/66* (2006.01)
*B60T 13/74* (2006.01)
(Continued)

(52) U.S. Cl.
CPC ............ *B60T 13/662* (2013.01); *B60T 13/74* (2013.01); *B60T 13/741* (2013.01); *F16D 65/18* (2013.01);
(Continued)

(58) Field of Classification Search
CPC ...... B60T 13/741; B60T 13/588; B60T 7/107; B60T 13/662; B60T 7/042; B60T 7/085;
(Continued)

(56) References Cited

U.S. PATENT DOCUMENTS 2,682,630 A * 6/1954 Keller ................. H02P 5/50
318/82
3,937,974 A * 2/1976 Lafuze .................. F02N 11/04
290/38 R
(Continued)

FOREIGN PATENT DOCUMENTS

DE 10 2006 052810 5/2008
DE 10 2010 002825 9/2011
(Continued)

*Primary Examiner* — Mussa A Shaawat
*Assistant Examiner* — Sanjeev Malhotra
(74) *Attorney, Agent, or Firm* — Norton Rose Fulbright US LLP

(57) ABSTRACT

A method for providing the clamping force generated by an electric brake motor in a parking brake, the clamping force being determined as a function of the motor constants of the brake motor based on instantaneous measured values of the motor current and the motor voltage.

10 Claims, 2 Drawing Sheets

(51) Int. Cl.
*F16D 65/18* (2006.01)
*F16D 121/04* (2012.01)
*F16D 121/24* (2012.01)
*F16D 123/00* (2012.01)

(52) U.S. Cl.
CPC ...... *F16D 2121/04* (2013.01); *F16D 2121/24* (2013.01); *F16D 2123/00* (2013.01)

(58) Field of Classification Search
CPC . B60T 7/12; B60T 13/22; B60T 13/58; B60T 13/746; B60T 8/1703; F16D 2121/02; F16D 2123/00; F16D 2121/14; F16D 2121/24; F16D 65/18; F16D 65/567; F16D 2055/0091; F16D 2065/386; F16D 2066/006; F16D 2125/40; F16D 2127/06; F16D 65/12; F16D 65/183; F16D 65/568
USPC ...... 701/34.4, 70; 188/34, 71.8, 71.9, 106 F, 188/106 P, 152, 156, 158, 170, 196 A; 30/210; 290/38 R; 303/89, 193; 322/23; 318/82, 380
See application file for complete search history.

(56) References Cited

U.S. PATENT DOCUMENTS

| | | | | |
|---|---|---|---|---|
| 4,779,711 A * | 10/1988 | Fabbro | ................. | F16D 65/567 188/196 A |
| 5,161,650 A * | 11/1992 | Taig | ................. | B60T 13/12 188/71.9 |
| 6,260,653 B1 * | 7/2001 | Forster | ................. | B60K 17/10 180/308 |
| 6,311,808 B1 * | 11/2001 | Halasy-Wimmer | ..... | B60R 25/08 188/106 F |
| 6,761,252 B1 * | 7/2004 | Weiler | ................. | B60T 13/741 188/71.8 |
| 2004/0238299 A1 * | 12/2004 | Ralea | ................. | B60T 7/085 188/156 |
| 2006/0091728 A1 * | 5/2006 | Fulks | ................. | B60T 7/22 303/193 |
| 2006/0207103 A1 * | 9/2006 | Tse | ................. | B26B 19/06 30/210 |
| 2007/0062766 A1 * | 3/2007 | Leinung | ................. | F16D 65/12 188/71.8 |
| 2007/0163848 A1 * | 7/2007 | Huber | ................. | B60T 13/04 188/71.9 |
| 2007/0175714 A1 * | 8/2007 | Saibold | ................. | B60T 13/22 188/170 |
| 2008/0084109 A1 * | 4/2008 | Griffith | ................. | B60T 13/746 303/89 |
| 2008/0186000 A1 * | 8/2008 | Kimura | ................. | B60L 15/025 322/23 |
| 2009/0058333 A1 * | 3/2009 | Okada | ................. | B66B 1/308 318/380 |
| 2009/0152054 A1 * | 6/2009 | Baumgartner | ........ | F16D 65/183 188/34 |
| 2011/0226569 A1 * | 9/2011 | Devlieg | ................. | B60T 8/1703 188/158 |
| 2012/0245816 A1 * | 9/2012 | Blattert | ................. | B60T 13/588 701/70 |
| 2012/0323436 A1 * | 12/2012 | Grieser-Schmitz | ..... | B60T 13/66 701/34.4 |
| 2013/0056315 A1 * | 3/2013 | Bieltz | ................. | B60T 7/042 188/106 P |
| 2013/0060439 A1 * | 3/2013 | Bieltz | ................. | B60T 7/042 701/70 |
| 2013/0175124 A1 * | 7/2013 | Tomczak | ................. | B60T 13/588 188/106 F |
| 2013/0325278 A1 * | 12/2013 | Bieltz | ................. | B60T 7/107 701/70 |
| 2013/0333988 A1 * | 12/2013 | Bieltz | ................. | B60T 7/042 188/152 |

FOREIGN PATENT DOCUMENTS

JP 2008286608 A 11/2008
WO 2012031804 A 3/2012

* cited by examiner

METHOD FOR PROVIDING THE CLAMPING FORCE GENERATED BY A PARKING BRAKE

FIELD OF THE INVENTION

The present invention relates to a method for providing the clamping force generated by a parking brake in a vehicle.

BACKGROUND INFORMATION

A method for estimating the clamping force of a parking brake generated by an electric brake motor is discussed in DE 10 2006 052 810 A1. The electric brake motor displaces a brake piston, which carries a brake pad, and presses the brake piston against a brake disk. To be able to determine the clamping force, the current, the supply voltage of the brake motor and the engine speed are measured; subsequently, the clamping force is ascertained from a differential equation system which describes the electrical and mechanical characteristics of the brake motor.

To be able to determine the clamping force as precisely as possible, the motor constant of the electric brake motor must be known, the value of which is subject to manufacturing tolerances and may also fluctuate due to aging and temperature.

SUMMARY OF THE INVENTION

An object of the present invention is to provide the clamping force in a parking brake including an electric brake motor with high precision using simple measures.

This object may be achieved by the features described herein. The further embodiments herein describe advantageous refinements.

The method according to the present invention relates to electromechanical parking brakes in vehicles, via which a clamping force holding the vehicle at a standstill may be generated. The parking brake has an electric brake motor, via which the clamping force is generated in an electromechanical manner. When the brake motor is activated, a brake piston, which carries a brake pad, is pressed against a brake disk. The parking brake may, if necessary, be equipped with an auxiliary braking device in order to additionally generate an auxiliary clamping force, so that the total clamping force is combined from the electromechanical portion provided by the brake motor and the auxiliary clamping force. The auxiliary braking device is, for example, a hydraulic braking system, in particular the hydraulic vehicle brake, via which a brake force for decelerating the vehicle is generated during normal vehicle operation. The hydraulic pressure acts on the brake piston.

In the case of the method according to the present invention, the motor constant of the electric brake motor, which is essential for ascertaining the clamping force, is ascertained from instantaneous measured values of the motor current and the motor voltage. The measured values are measured during an activation of the brake motor. The no-load current and the no-load voltage are ascertained during a no-load phase of the brake motor and the motor current is ascertained during a dynamic current change phase. Consequently, adequate information is available to be able to calculate the instantaneous value of the motor constants. The motor constant is temperature and aging-dependent; moreover, the value of the motor constants, which is known per se, is subject to manufacturing tolerances. The motor constants may be determined with high precision using the measured values of motor current and motor voltage; moreover, the clamping force may be calculated with an equivalent high precision. For this purpose, the motor load torque is initially calculated and the effective clamping force is calculated from it under consideration of the gear reduction ratio. Basically, the current and the voltage in the electric brake motor are sufficient as measured variables.

In the no-load phase of the brake motor, it is possible to ascertain the no-load current and the no-load voltage with high precision. The no-load phase is present when the absolute value of the gradient of the motor current or the motor voltage is at least approximately equal to zero or falls below an assigned threshold value. In the dynamic current change phase, on the other hand, multiple current measured values are advantageously ascertained and used as a basis for the calculation of the motor constants. Consequently, a database of adequate size is present to be able to determine the motor constants with high reliability and precision.

According to one advantageous embodiment, the measured values are ascertained during a clamping operation of the brake motor, i.e., when an electromechanical clamping force is generated. During the clamping operation, it is possible to distinguish different phases, inter alia a start phase having high dynamics in the current profile and a subsequent no-load phase having approximately constant motor current and constant motor voltage. As a dynamic current change phase, in particular, the start phase is used after the brake motor is switched on, whereas the no-load phase immediately follows the start phase. However, it is basically also possible to determine the current and voltage values during another activation phase of the electric brake motor, in particular during the release phase.

Advantageously, the motor constant is calculated in a recursive algorithm, for example, based on the least error squares method. During the current change phase, multiple current values are measured, which are given to the recursive algorithm as a basis. If the number of measured values is adequately large, parameters may be determined on which the calculation of the motor constants may be based.

The motor constant depends on the total resistance between the voltage source and the motor. This total resistance, which is combined additively from the motor resistance and the line resistances, may be ascertained as a function of the no-load voltage and the no-load current as well as a first parameter. Subsequently, the motor constant is calculated under consideration of the total resistance and a second parameter, the first and second parameters being calculated in a recursive algorithm from the instantaneous current values during the dynamic current change phase.

The motor constant and the clamping force instantaneously provided by the electric brake motor may, for example, be ascertained during each activation of the brake motor, in particular for generating a clamping force. During the clamping operation, the dynamic current values which drop sharply after the current is switched on are measured and buffered. In the subsequent no-load phase, the no-load current and the no-load voltage are ascertained, and subsequently the recursive algorithm is run through for determining the auxiliary variables or parameters on which the calculation of the total resistance and the motor constants is based. Knowledge of the motor constants makes it possible to determine the instantaneous motor load torque and from it the clamping force.

The method according to the present invention is run in a regulating or control unit in the vehicle, which may be an integral part of the parking brake.

Additional advantages and advantageous embodiments may be derived from the additional claims, the description of the figures and the drawings.

DETAILED DESCRIPTION

Figure 1:
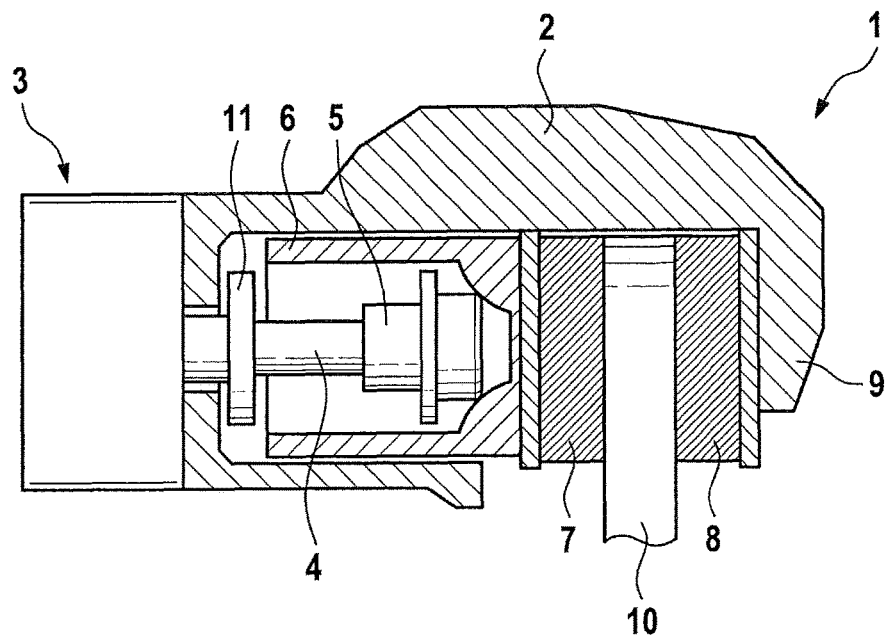
FIG. 1 shows a section through an electromechanical parking brake for a vehicle, including an electric brake motor for generating a clamping force holding the vehicle at a standstill.

FIG. 1 shows an electromechanical parking brake 1 in a vehicle, it being possible to generate a clamping force holding the vehicle at a standstill via the parking brake. Parking brake 1 includes a brake caliper 2 including a caliper unit 9 which reaches over a brake disk 10. A brake motor 3 configured as an electric motor functions as an actuator of parking brake 1, brake motor 3 rotating a spindle 4, on which a spindle component 5 is axially displaceable and is rotationally fixed in relation to the housing. Spindle component 5 is displaced axially when spindle 4 rotates. Spindle component 5 moves within a brake piston 6, which is the carrier of a brake pad 7, which is pressed by brake piston 6 against brake disk 10. Another brake pad 8 which is held stationary on caliper unit 9 is situated on the opposite side of brake disk 10.

Within brake piston 6, spindle component 5 is enabled to move axially forward in the direction of the brake disk when spindle 4 is rotated, or to move axially rearward until reaching a stop 11 when spindle 4 is rotated in the opposite direction. For generating a desired clamping force, spindle component 5 acts on the inner face of brake piston 6, causing brake piston 6, which is axially displaceably supported in parking brake 1, to be pressed with its brake pad 7 against the face surface of brake disk 10.

The hydraulic pressure of the normal hydraulic vehicle brake, which is used for decelerating the vehicle during travel, also acts on the brake piston. The hydraulic pressure may also act in a supportive manner when the parking brake is activated to hold the vehicle at a standstill, so that the total clamping force is combined from the portion provided by the electric motor and the hydraulic portion.

Figure 2:
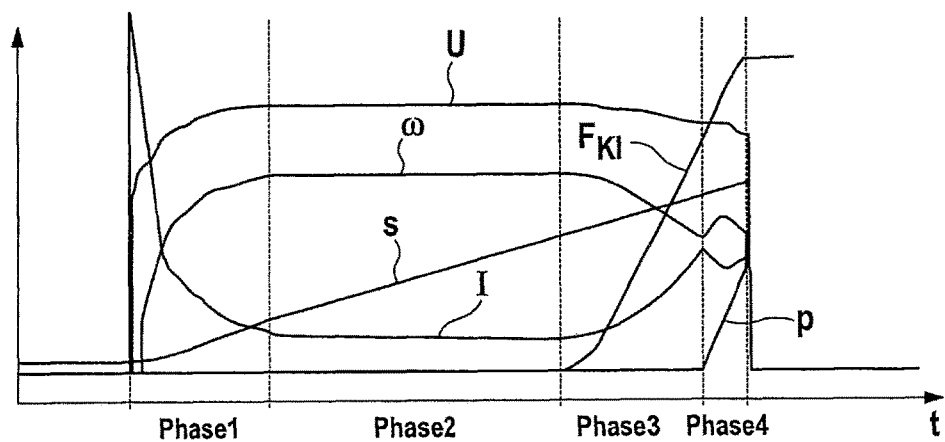
FIG. 2 shows the shape of the curve over time of different state variables of the parking brake during a clamping operation of the parking brake.

A diagram is shown in FIG. 2 including current profile I, voltage U, speed curve ω of the electric brake motor, travel s of spindle component 5, generated clamping force $F_{KI}$ as well as hydraulic pressure p in a time-dependent manner for a clamping operation. At the beginning of phase 1, the clamping operation starts, in that an electric voltage is applied and the brake motor is energized with the circuit closed. At the end of phase 1, voltage U and motor speed ω have reached their maximum. Phase 2 represents the no-load phase in which current I moves at a minimum level. This is followed by force build-up phase 3 including increasing electromechanical clamping force in which the brake pads are in contact with the brake disk and are pressed against the brake disk with increasing clamping force.

In phase 4, hydraulic pressure p of the vehicle brake additionally acts on the brake piston, so that total clamping force $F_{KI}$ is additively combined from the portion of the clamping force provided by the electric brake motor and the hydraulic portion. At the end of phase 4, the electric brake motor is switched off by opening the circuit; in addition, the pump motor of the hydraulic vehicle brake is switched off. Consequently, hydraulic pressure p, current I, voltage U and speed ω of brake motor 3 drop to zero. Total clamping force $F_{KI}$ is maintained.

To determine the instantaneous value of the generated clamping force with high precision during the clamping operation, motor constant $K_M$ is initially ascertained, from which clamping force $F_{KI}$ may be calculated according to a known, functional relationship $$F_{KI} = f(K_M)$$

Motor constant $K_M$ may be calculated as a function of total resistance $R_{ges}$, which is combined from the sum of the individual resistances of brake motor and lines to the brake motor, under consideration of mass moment of inertia $J_{ges}$ of the brake motor including a downstream gear unit, and a scanning time $T_A$ as well as a parameter or an auxiliary variable $\gamma_2$ according to the equation $$K_M = \sqrt{\frac{\gamma_2 \cdot R_{ges} \cdot J_{ges}}{T_A}}$$

where total resistance $R_{ges}$ is ascertained as a function of no-load current $I_0$, no-load voltage $U_{s0}$ and a parameter or an auxiliary variable $\gamma_1$ according to $$R_{ges} = \frac{U_{s0}}{e^{\gamma_1} + I_0}$$

The two auxiliary variables or parameters $\gamma_1$, $\gamma_2$ are calculated in a recursive algorithm, for example, according to the least error squares method, from multiple measuring points for motor current $I_A$, which is calculated during the dynamic current change phase shortly after the brake motor is switched on, from the equations $$y(n) = \gamma_1 + \gamma_2 \cdot n$$

$$y(n) = \ln(I_A(n) - I_0)$$

where n denotes an integer control variable for the consecutive, discrete points in time at which current $I_A$ is measured in the interval of scanning time $T_A$.

Figure 3:
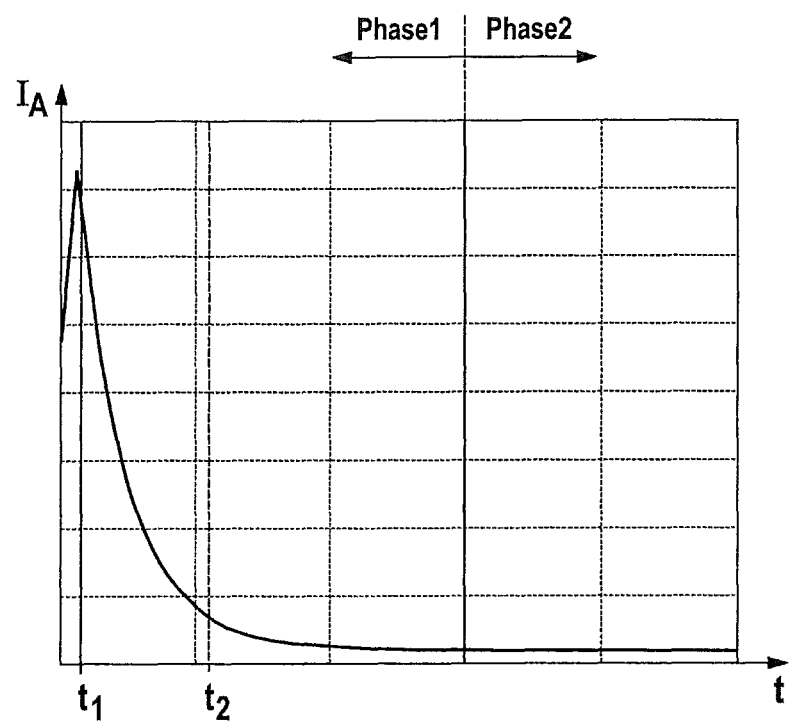
FIG. 3 shows phases 1 and 2 during a clamping operation of the electric brake motor including a curve of motor current $I_A$.

Phase 1 and phase 2 during the clamping operation of the electric brake motor including the curve of motor current $I_A$ are shown in FIG. 3. When the brake motor is switched on, motor current $I_A$ reaches a peak and subsequently drops off sharply. Immediately after the current peak is exceeded, the measurement of the current values begins at point in time $t_1$ until point in time $t_2$ in equidistant time intervals corresponding to scanning time $T_A$. Measured current values $I_A$ are stored.

In phase 1, the period of time between points in time $t_1$ and $t_2$ represent a dynamic current change phase, which is characterized by a high current gradient. Starting point in time $t_1$ and ending point in time $t_2$ may be defined variably based on assigned gradient threshold values for the motor current. The evaluation of the measured values begins when starting point in time $t_1$ of the current gradient falls below a negative threshold value. The evaluation ends at ending point in time $t_2$ when the current gradient exceeds a second threshold value, the absolute value of the second threshold value being smaller than the absolute value of the first threshold value.

Phase 2 is the no-load phase of the brake motor, in which the current gradient is at least approximately equal to zero. In this phase, at least one measured value is determined in each case for determining no-load current $I_0$ and no-load voltage $U_{s0}$. The point in time for the measurement depends on the gradients of the current or the voltage. If the gradient falls short of an assigned threshold value, the measurement or the evaluation is carried out.

Consequently, based on current and voltage measurements during the clamping operation of the electric brake motor, all information is present for determining the instantaneously acting clamping force with high precision.

What is claimed is:

1. A method for providing a clamping force generated by a parking brake in a vehicle, the method comprising:
    determining the clamping force, which is at least partially generated by an electromechanical braking device which includes an electric brake motor which applies a brake piston against a brake disk, as a function of a motor constant of the brake motor, the motor constants being ascertained from instantaneous measured values of motor currents, which are measured during an activation of the brake motor;
    wherein for determining the motor constant, a no-load voltage and a no-load current are measured on the brake motor during a no-load phase, and the motor current is ascertained during a dynamic current change phase.

2. The method of claim 1, wherein the measured values are ascertained during a clamping operation of the brake motor for generating the clamping force.

3. The method of claim 2, wherein the motor current is ascertained after the brake motor is switched on during an initial phase of the current and the no-load current is ascertained during a subsequent phase.

4. The method of claim 1, wherein multiple measured values of the motor current are ascertained in the dynamic current change phase and used as a basis for the calculation of the motor constants.

5. The method of claim 1, wherein the motor constant is calculated in a recursive algorithm.

6. The method of claim 1, wherein the motor constant is calculated according to the equation $$R_{ges} = \frac{U_{s0}}{e^{\gamma_1} + I_0}$$

$$K_M = \sqrt{\frac{\gamma_2 \cdot R_{ges} \cdot J_{ges}}{T_A}}$$

where
$R_{ges}$ denotes the total resistance of the brake motor and line resistances
$U_{s0}$ denotes the no-load voltage on the brake motor
$I_0$ denotes the no-load current of the brake motor
$J_{ges}$ denotes the mass moment of inertia of the brake motor including a downstream gear unit
$T_A$ denotes a scanning time
and $\gamma_1$, $\gamma_2$ are variables that are calculated recursively according to the equations $$y(n)=\gamma_1+\gamma_2 \cdot n$$

$$y(n)=\ln(I_A(n)-I_0),$$

where
n denotes an integer control variable for consecutive, discrete points in time,
$I_A$ denotes the motor current during a dynamic current change phase.

7. The method of claim 6, wherein the variables $\gamma_1$, $\gamma_2$ are calculated in a recursive algorithm.

8. The method of claim 6, wherein the variables $\gamma_1$, $\gamma_2$ are calculated in a recursive algorithm according to a least error squares method.

9. A regulating/control unit for providing a clamping force generated by a parking brake in a vehicle, comprising:
    a determining arrangement to determine the clamping force, which is at least partially generated by an electromechanical braking device which includes an electric brake motor which applies a brake piston against a brake disk, as a function of a motor constant of the brake motor, the motor constants being ascertained from instantaneous measured values of motor currents, which are measured during an activation of the brake motor;
    wherein for determining the motor constant, a no-load voltage and a no-load current are measured on the brake motor during a no-load phase, and the motor current is ascertained during a dynamic current change phase.

10. A parking brake in a vehicle, comprising:
    a regulating/control for providing a clamping force generated by a parking brake in a vehicle, including:
        a determining arrangement to determine the clamping force, which is at least partially generated by an electromechanical braking device which includes an electric brake motor which applies a brake piston against a brake disk, as a function of a motor constant of the brake motor, the motor constants being ascertained from instantaneous measured values of motor currents, which are measured during an activation of the brake motor;
        wherein for determining the motor constant, a no-load voltage and a no-load current are measured on the brake motor during a no-load phase, and the motor current is ascertained during a dynamic current change phase.

* * * * *